United States Patent [19]

Morimoto

[11] Patent Number: 5,009,472
[45] Date of Patent: Apr. 23, 1991

[54] LIGHT SCANNING DEVICE WITH POLARIZING DEVICE TO MAKE LIGHT TRANSMISSION MORE UNIFORM

[75] Inventor: Akira Morimoto, Tokyo, Japan

[73] Assignee: Asahi Kogaku Kogyo Kabushiki Kaisha, Tokyo, Japan

[21] Appl. No.: 140,166

[22] Filed: Dec. 31, 1987

[30] Foreign Application Priority Data

Jan. 8, 1987 [JP] Japan .................................. 62-1100
Jan. 16, 1987 [JP] Japan .................................. 62-4583

[51] Int. Cl.⁵ ....................... G02B 26/10; G02B 26/02
[52] U.S. Cl. ...................................... 350/6.5; 350/6.8; 350/399; 350/400
[58] Field of Search ................... 350/6.5, 6.8, 6.1, 6.6, 350/6.7, 6.9, 6.91, 399, 400, 401, 402, 403

[56] References Cited

U.S. PATENT DOCUMENTS

| | | | |
|---|---|---|---|
| 3,801,182 | 4/1984 | Jones | 350/6.8 |
| 4,715,699 | 12/1987 | Morimoto | 350/6.8 |
| 4,796,961 | 1/1989 | Yamada et al. | 350/6.8 |
| 4,796,965 | 1/1989 | Ishikawa | 350/6.5 |

FOREIGN PATENT DOCUMENTS

| | | | |
|---|---|---|---|
| 43619 | 2/1987 | Japan | 350/401 |
| 43620 | 2/1987 | Japan | 350/401 |

OTHER PUBLICATIONS

IBM Tech. Dis. Bull., "CO₂ Laser Scanning ... " vol. 29, No. 12, May 1987 pp. 5197-5199.
Donald A. Dery, "Controlling Light ... ", *Manufacturing Optician*, vol. 17, No. 6, Mar. 1964, pp. 268-270.

*Primary Examiner*—Jon W. Henry
*Attorney, Agent, or Firm*—Sandler, Greenblum & Bernstein

[57] ABSTRACT

A light scanning device comprising a light source portion equipped with a semiconductor laser, a deflecting system for deflecting light beam emitted by the light source portion, a scanning lens for imaging light beam deflected by the deflecting system on a subject to be scanned, and a polarizing device for changing a polarized state of light beam so that the vibrating plane of an electric field vector of light beam entering into the scanning lens does not become perpendicular to a plane of incidence which includes an optical axis of the scanning lens and an incident direction of the light beam.

25 Claims, 5 Drawing Sheets

LIGHT SCANNING DEVICE WITH POLARIZING DEVICE TO MAKE LIGHT TRANSMISSION MORE UNIFORM

BACKGROUND OF THE INVENTION

1. Field of the Invention

The present invention relates to a light scanning device using a semiconductor laser as a light source, and more particularly to an optical system of a light scanning device used in a laser printer, etc.

2. Background of the Prior Art

Heretofore, there is known a light scanning device using a semiconductor laser as exemplified in FIG. 4.

As is shown in FIG. 4, this light scanning device comprises a semiconductor laser 1 for emitting a light beam, a collimate lens 2 for collimating the light beam, a polygon mirror 3 rotatable about an axis l, an fθ lens 4 for imaging the light beam reflected by the polygon mirror 3 on a photosensitive drum 5 as a subject to be scanned.

The light beam emitted by the semiconductor laser 1 enters, at various angles, into the fθ lens 4 according to the rotation of the polygon mirror 3. As a result, a spot S imaged on the photosensitive drum 5 is scanned in a principal scanning direction m to form a series of dots on the photosensitive drum 5 according to the output of the semiconductor laser 1.

The photosensitive drum 5 is rotated in a secondary scanning direction n, and an output image is formed, as a collection of dots, by the aforementioned action.

Now, two characteristic points of a light beam emitted by the semiconductor laser will be described.

First, the shape of a light beam is oval (elliptical), as shown in FIG. 5, having a ratio of 1:1.5~3 between a short axis parallel to a direction x of a p-n junction and a long axis perpendicular thereto. Second, the polarizing state thereof is a linearly polarized light which vibrates within an x-z plane including the direction x in which an electric field vector is in parallel with the p-n junction and a progressing direction z of the light beam.

The shape of the spot S imaged on the photosensitive drum 5 is preferably oval (elliptical) having a short axis parallel to the principal scanning direction m in order to form a clear output image on the photosensitive drum 5. Furthermore, in order to form such a shape as mentioned on the photosensitive drum 5, it is necessary that an oval (ellipse) shaped light beam having a short axis parallel to the secondary scanning direction enters into the fθ lens 4. As the diameter of the spot where the beam is condensed is proportional to the inverse of the diameter of the incident light beam, the long axis at the point of incidence becomes the short axis on the image surface.

In this device, therefore, the semiconductor laser 1 is disposed as such that the short axis of the oval (ellipse) shaped light beam emitted by the semiconductor laser 1 is in parallel with the rotary axis l of the polygon mirror 3, while the short axis of the oval (elliptical) shaped spot S is parallel with the principal scanning direction m.

With the above-mentioned arrangement, however, since a vibrating plane A (FIG. 6) of the electric field vector of the light beam entering into the fθ lens 4 becomes perpendicular to an incident plane B including an incident optical path of the light beam and an incident normal of an end face C at an incident side of the fθ lens 4, the light beam becomes an s-polarized light when entering outside the optical axis of the fθ lens 4.

The light beam entering as an s-polarized light is comparatively large in change of the transmittance due to the change of this incident angle compared with a p-polarized light or a circularly polarized light.

Specifically, when a monolayer four kinds of anti-reflection coating is applied to the end face C of the fθ lens 4, the transmittance changes as shown by broken lines in FIG. 7, and when a monolayer 780 of the anti-reflection coating is applied, it changes as shown by broken lines in FIG. 8.

Therefore, in the above-mentioned device, the light beam reaching the photosensitive drum 5 is greatly changed in intensity depending on whether the light beam enters into the fθ lens 4 on the optical axis thereof or outside the optical axis.

In this way, if the light beam passing through the fθ lens 4 is not uniform in light quantity, an output image formed on the photosensitive drum 5 also becomes nonuniform. Therefore, in a laser printer, for example, the image that is printed on paper is non-uniform.

SUMMARY OF THE INVENTION

An object of the present invention is to provide a light scanning device, in which light beam reaching a subject to be scanned is hardly changed in intensity affected by the changes of an incident angle of the light beam into a scanning lens and the non-uniformity of an output image can be reduced.

Since the light beam emitted by the semiconductor laser has such a shape and polarization characteristics as mentioned above, in order to form a spot having a short axis parallel to the principal scanning direction and in order not to enter the s-polarized light into the scanning lens, the polarized state of the light beam must be converted before the light beam enters into the scanning lens.

Therefore, an attempt has been made in order to achieve the above-mentioned object by providing a light scanning device of the present invention comprising a light source portion equipped with a semiconductor laser, deflecting means for deflecting light beam emitted by the light source portion, a scanning lens for imaging light beam deflected by the deflecting means on a subject to be scanned, and a polarizing device for changing a polarized state of light beam so that the vibrating plane of an electric field vector of light beam entering into the scanning lens does not become perpendicular to a plane of incidence which includes an optical axis of the scanning lens and an incident direction of the light beam.

According to the above-mentioned structure, the nonuniformity of transmitting characteristics can be reduced compared with the prior art.

The above-mentioned and other objects, characteristic features and advantages of the present invention will become more apparent to those skilled in the art from the following detailed description with reference to the accompanying drawings, wherein:

DETAILED DESCRIPTION OF THE PREFERRED EMBODIMENTS

Embodiments of the present invention will be described hereunder with reference to the accompanying drawings.

EXAMPLE 1

Figure 1:
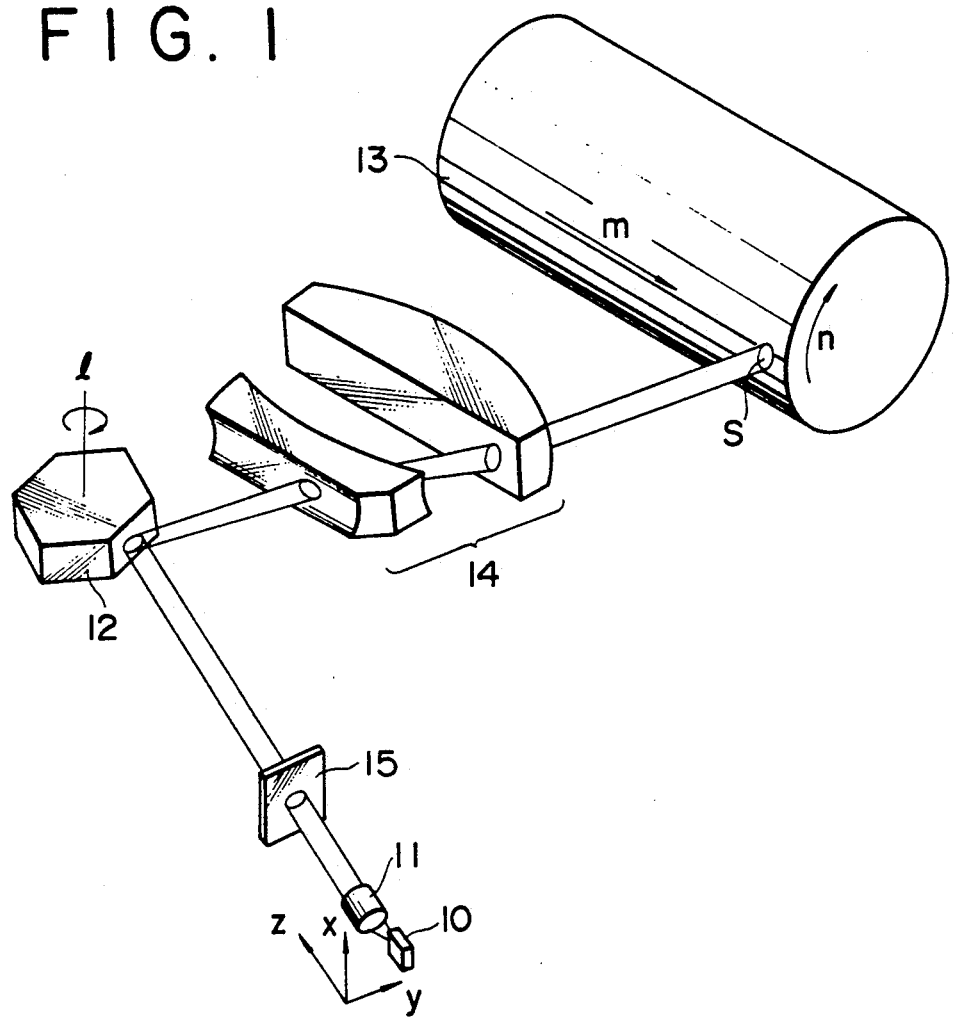
FIG. 1 is a block diagram showing a first embodiment of a light scanning device according to the present invention.

FIG. 1 shows a first embodiment of the present invention.

As is shown in the figure, this light scanning device is embodied as a laser printer including a light source device comprising a semiconductor laser 10 and a collimate lens 11, a polygon mirror 12 as a deflecting means, a photosensitive drum 13 as a subject to be scanned, and an fθ lens 14 as a scanning lens.

The polygon mirror 12 has a constant angular velocity deflection characteristic. The distortion characteristic $F(\theta)$ of the fθ lens 14 is expressed by $F(\theta) = f\theta$, wherein f is a focal distance of the scanning lens and $\theta$ is a deflecting angle.

Figure 5:
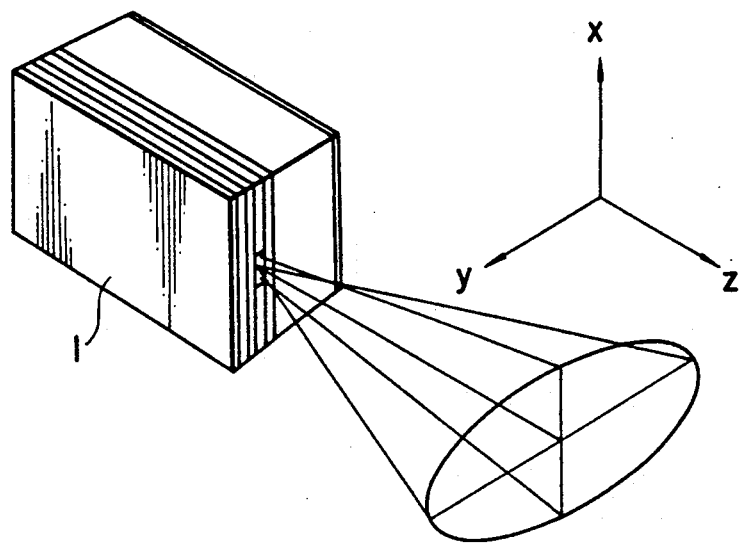
FIG. 5 is a perspective view for explaining light beam emitted by a semiconductor laser.
Figure 6:
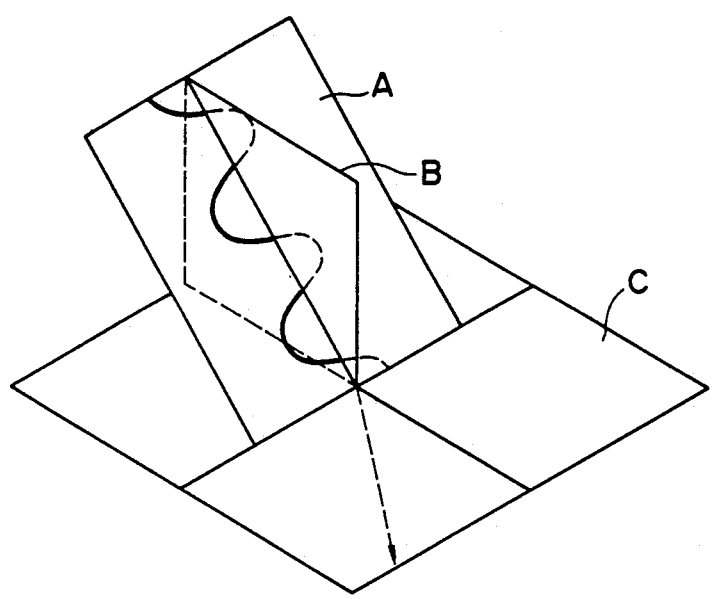
FIG. 6 is a schematic view showing the relation between the incident plane of the scanning lens in the device of FIG. 4 and the vibrating plane of the electric field vector.

Light beam emitted by the semiconductor laser 10 exhibits an oval (elliptical) shape having a short axis parallel to a direction x of a p-n junction and a long axis parallel to a direction y and perpendicular to the direction x as shown in FIG. 5. Moreover, the light beam becomes a linearly polarized light having a vibrating plane of an electric field vector within an x-z plane wherein z is a progressing direction of the light beam.

Due to the foregoing arrangement, in order to form a spot having a short axis parallel to a principal scanning direction m on the photosensitive drum 13 and to prevent s-polarized light from entering into the fθ lens 14, it is required that an oval (elliptical) shaped light beam having a short axis parallel to a secondary scanning direction n enters into the fθ lens 14 and the polarizing state of the light beam is transfigured before the light beam enters into the fθ lens 14. Therefore, in this example, a half wavelength plate 15 as a polarizing device for changing the polarizing state of the light beam is disposed somewhere in an optical path between the collimate lens 11 and the polygon mirror 12.

The light beam emitted by the semiconductor laser 10 is collimated by the collimate lens 11 and enters into the half wavelength plate 15. The half wavelength plate 15 converts a linearly polarized light beam vibrating within the x-z plane into a linearly polarized light vibrating within the y-z plane and then emits the same.

The light beam converted in its polarized state is reflected and deflected by the polygon mirror 12 towards the fθ lens 14 and forms an oval (elliptical) shaped spot S having a short axis parallel to the principal scanning direction m on the photosensitive drum 13 through the fθ lens 14. This spot S exhibits an oval (elliptical) shape having a short axis parallel to the principal direction m and is scanned in the principal scanning direction m by the rotation of the polygon mirror 12.

Figure 2:
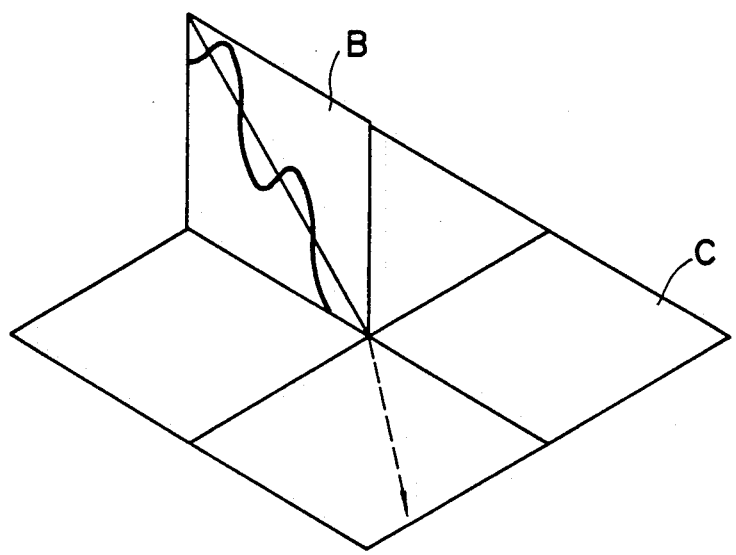
FIG. 2 is a schematic view for explaining the relation between a vibrating plane of an electric field vector of light beam and a plane of incidence thereof.

In the light beam entering into the fθ lens 14, the vibrating plane of the electric field vector coincides with an incident plane B. Accordingly, the light beam now in its p-polarized light enters into the fθ lens 14 outside the optical axis (FIG. 2).

Figure 7:
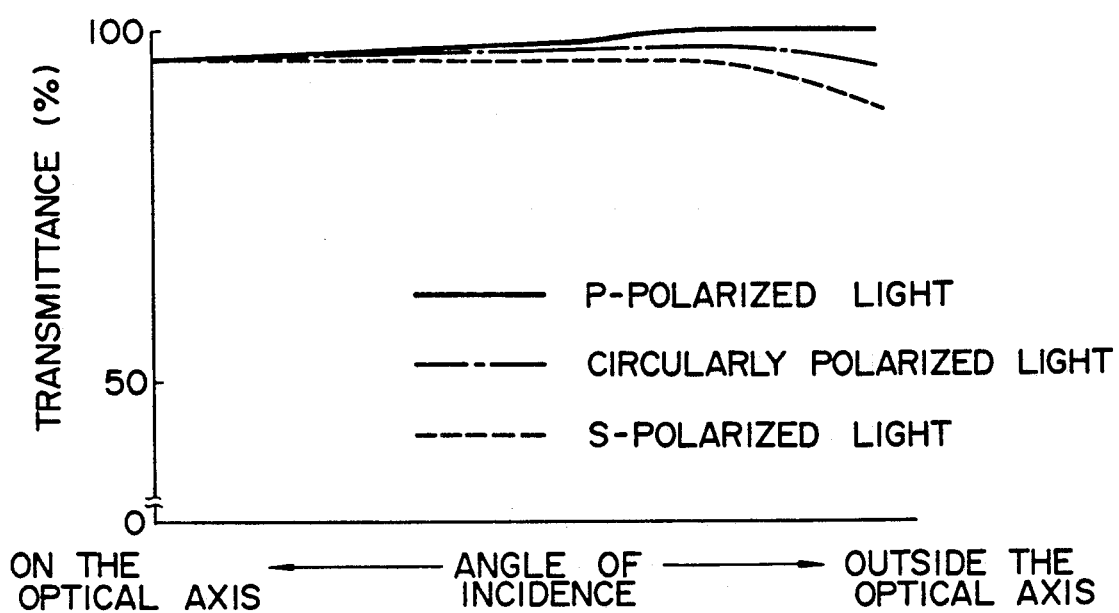
FIG. 7 and FIG. 8 are graphs showing the changes of transmittance due to differences of incident angle into scanning lenses which are respectively applied with anti-reflection coating of monolayer four kinds and monolayer 780.
Figure 8:
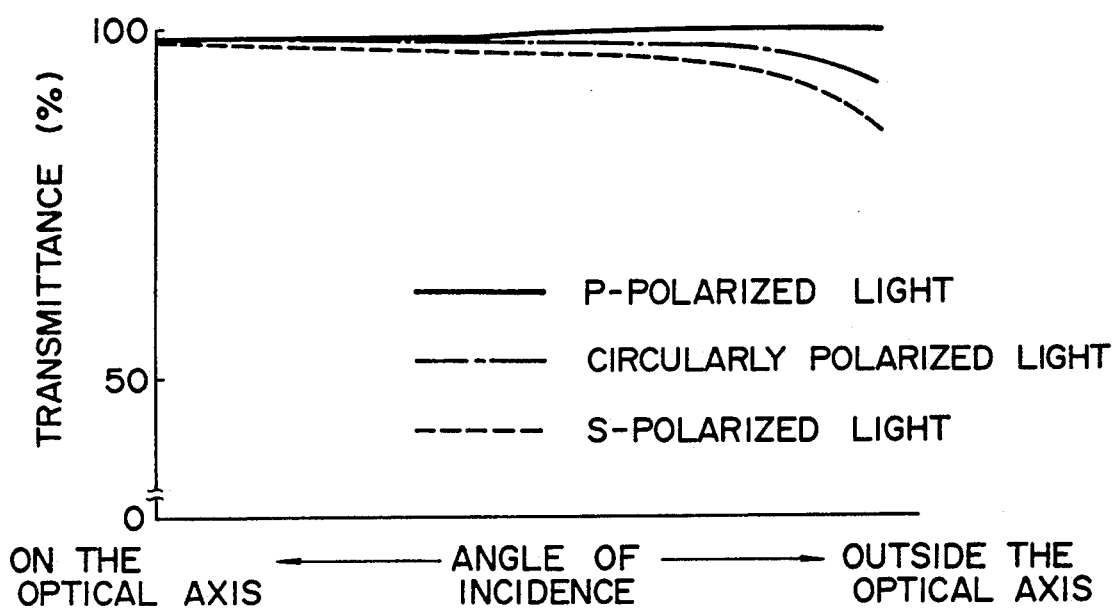

Therefore, even if the incident angle of the light beam is changed with respect to the fθ lens 14 due to the rotation of the polygon mirror 12, the transmittance is hardly changed as shown by continuous line in FIGS. 7 and 8, and the nonuniformity of light quantity due to the changes of transmittance can be prevented from occurring on the photosensitive drum 13.

And, the photosensitive drum 13 is rotated in a secondary scanning direction n by a driving mechanism (not shown) and an output image is formed on the photosensitive drum 13 according to the output of the semiconductor laser by these actions. Thereafter, a toner is attracted to the photosensitive drum 13 according to the output image and this is transferred onto paper by a transfer unit (not shown).

In the above-mentioned embodiment, a half wavelength plate is used as a polarizing device to polarize light beam entering into the fθ lens 14 to obtain a p-polarized light. Alternatively, instead of polarizing the light beam to obtain such a perfect p-polarized light as mentioned, it may be polarized to obtain light containing at least a p-composition. In this way, the change of transmittance can be more restricted than the prior art. For example, a quarter wavelength plate may be employed so as to allow a circularly polarized light to enter into the fθ lens 14.

Figure 9:
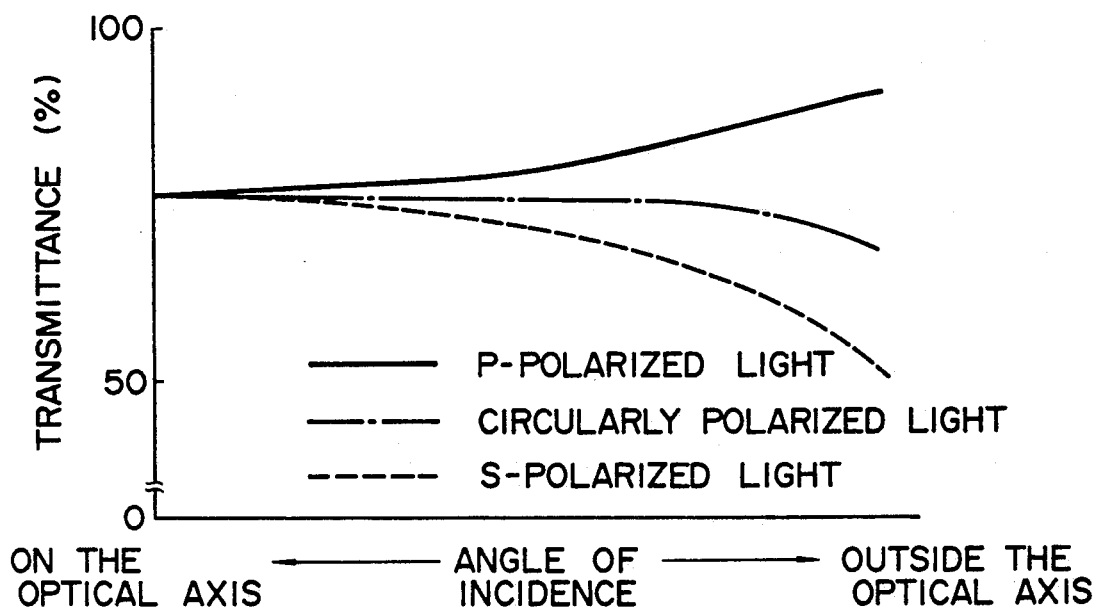
FIG. 9 is a graph showing the changes of transmittance due to differences of incident angle into a scanning lens which is not applied with an anti-reflection coating.

The circularly polarized light, when the incident end face is not applied with an anti-reflection coating, is effective for preventing the change of transmittance as shown by alternate long and short dash line in FIG. 9.

EXAMPLE 2

Figure 3:
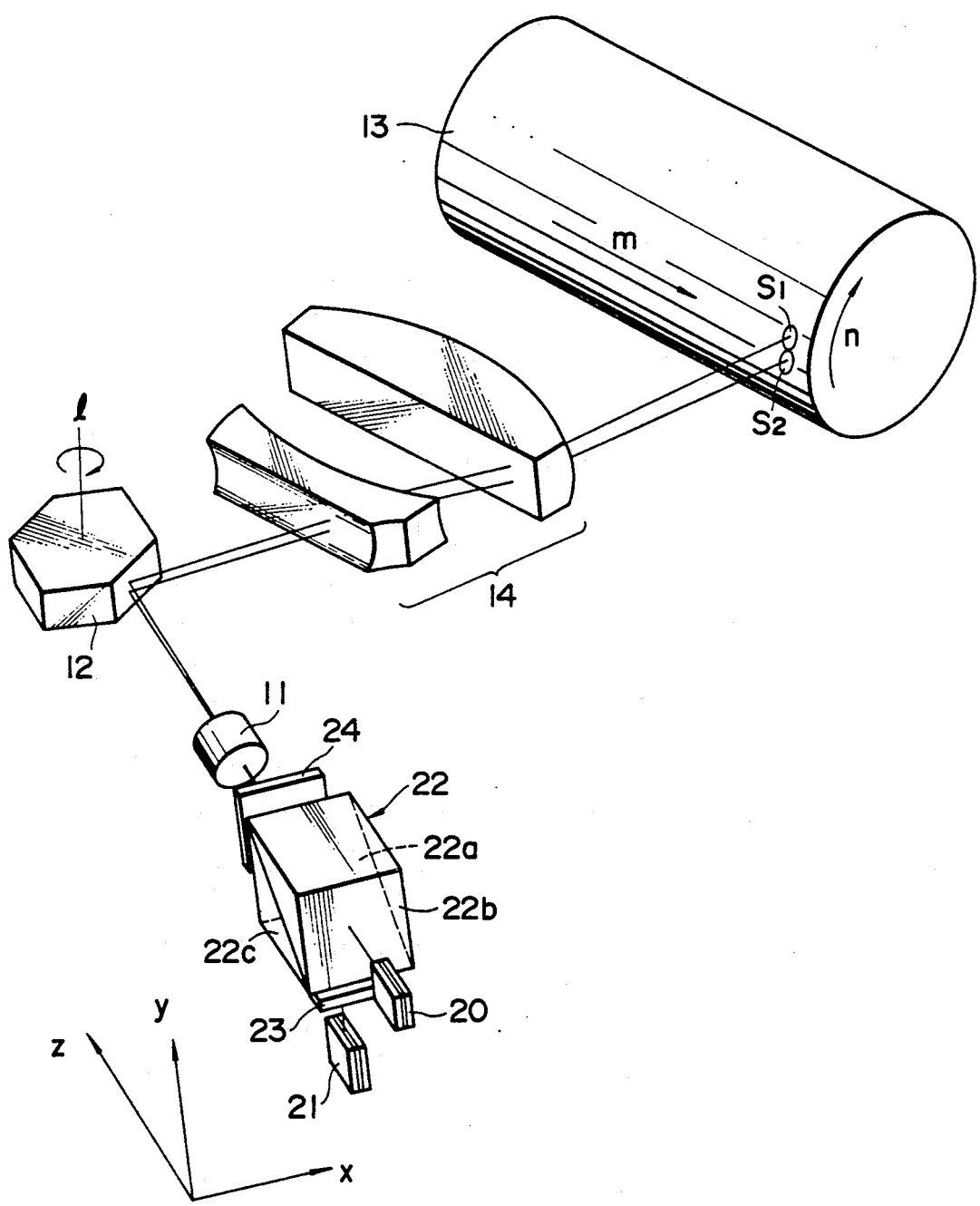
FIG. 3 is a block diagram showing a second embodiment of a light scanning device according to the present invention.
Figure 4:
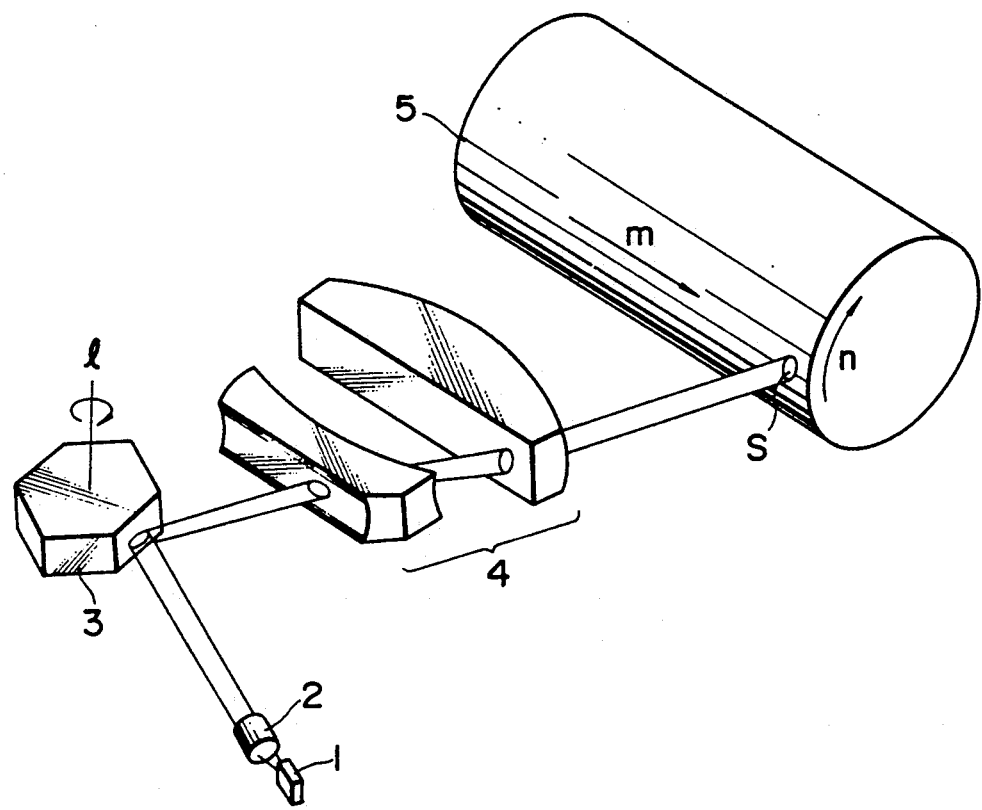
FIG. 4 is a block diagram of a prior art device.

FIG. 3 illustrates a second embodiment of the present invention.

As is shown in the figure, this light scanning device is embodied as a laser printer including a light source device equipped with two semiconductor lasers 20 and 21, a polygon mirror 12 as deflecting means, a photosensitive drum 13 as a subject to be scanned, and an fθ lens 14 as a scanning lens.

The light source device, in this example, is equipped with a polarizing beam splitter 22 as a beam splitter in which the light beams emitted by two semiconductor lasers 20 and 21 enter from the directions perpendicular to each other.

The polarizing beam splitter 22 comprises two rectangular prisms, the slant faces of which are jointed to form a cube. In the polarizing beam splitter 22, a slant face 22a is disposed perpendicular to a y-z plane in the figure, a face 22b where the light beam coming from the first semiconductor laser 20 enters, is disposed parallel to an x-y plane, and a face 22c where the light beam coming from the second semiconductor laser 21 enters, is disposed parallel to an x-z plane. This polarizing beam splitter 22 has such a characteristic as that the p-polarized light which the vibrating plane of the electric field vector is in parallel to the incident plane (the plane including the incident normal of the slant face 22a and the entering light) is passed, the s-polarized light which the vibrating plane of the electric field vector is in perpendicular to the incident plane is reflected.

Therefore, in order to emit the light beams coming from the semiconductor lasers 20 and 21 and entering through the different planes in the same direction, in the arrangement of FIG. 3, it is required that the light beam coming from the semiconductor laser 20 is caused to enter into the slant face 22a as the p-polarized light and the light beam coming from the semiconductor laser 21 is caused to enter therein as the s-polarized light.

On the other hand, in order to form a clear image, it is desirable to form a spot having a short axis parallel to the principal scanning direction m on the photosensitive drum 13 as described. To this end, therefore, an oval (elliptical) shaped light beam having a short axis parallel to the secondary scanning direction n must be caused to enter into the fθ lens 14.

In view of these two requirements and the characteristic of the light beam (which exhibits an oval (elliptical) shape in section having a short axis parallel to the p-n junction direction and a long axis perpendicular thereto and which becomes a linearly polarized light in which an electric field vector vibrates within a plane including the short axis direction and the light beam progressing direction) emitted by the semiconductor laser, in this example, two semiconductor lasers 20 and 21 are disposed as such that those p-n junction planes are in parallel with the y-z plane in the figure and at the same time, the half wavelength plate 23 for converting light beam into an s-polarized light is disposed between the semiconductor laser 21 and the polarizing beam splitter 22.

With the above-mentioned arrangement, two light beams can be emitted in parallel relation towards the z direction and in addition, the spots $S_1$ and $S_2$ having a short axis parallel to the principal scanning direction m can be formed on the photosensitive drum 13 to be scanned.

Although the two light beams emitted by the polarizing beam splitter 22 are formed in an oval (elliptical) shape having a short axis in the y axis direction and a long axis in the x axis direction and have an identical sectional shape, the vibrating planes of the linearly polarized light of the of the electric field vector become perpendicular to each other. That is, when these light beams enter into the fθ lens 14 outside the optical axis, the beam emitted by the first semiconductor laser 20 becomes an s-polarized light, while the beam emitted by the second semiconductor laser 21 becomes a p-polarized light. Accordingly, the changes of transmittance become different with respect to the fθ lens 14 as shown in FIGS. 7 through 9.

Therefore, when two light beams emitted by the polarizing beam splitter 22 are caused to enter into the fθ lens 14 as they are, in the manner as described above, the spots $S_1$ and $S_2$ formed on the photosensitive drum 13 change in intensity differently, respectively, and the output images formed are different in density particularly on the peripheral area thereof according to each row of the dots.

Therefore, in a light scanning device of the present invention, in order to solve the above-mentioned problem, a quarter wavelength plate 24 is disposed between the polarizing beam splitter 22 and the collimate lens 11, and two light beams are circularly polarized.

The circularly polarized light, when the incident end face is not applied with the anti-reflection coating, is also effective for preventing the change of transmittance as shown in FIG. 9.

With the above-mentioned structure, the light beam emitted by each semiconductor laser 20, 21, is deflected towards the same direction by the polarizing beam splitter 22 and converted into a circularly polarized light in which electric field vectors are rotated in the opposite directions by the quarter wavelength plate 24. And, these two light beams are collimated by the collimate lens 11, reflected by the polygon mirror 12 and entered into the fθ lens 14, and changed in shape such that the short axis and the long axis thereof are changed over when passing through the fθ lens 14, and then form the spots $S_1$ and $S_2$ on the photosensitive drum 13.

These spots $S_1$ and $S_2$ exhibit oval (elliptical) shapes each having a short axis parallel to the principal scanning direction m and are formed side by side along the secondary scanning direction n, and are scanned in the principal scanning direction m according to the rotation of the polygon mirror 12. And, the photosensitive drum 13 is rotated in the secondary scanning direction n by a driving mechanism (not shown). By these actions, output images are formed on the photosensitive drum 13 according to the output of the semiconductor laser.

When scanning, the first semiconductor laser 20 and the second semiconductor laser 21 are driven by separate signals, and the spot $S_1$ forms dots for the first row, whereas the spot $S_2$ forms dots for the second row. Therefore, two rows of dots can be simultaneously formed by one scanning. If the speed of the scanning is constant, output images can be formed on the photosensitive drum 13 in a half time of the first embodiment.

Thereafter, a toner is attracted to the photosensitive drum 13 according to the output image and this is transferred onto paper by a transfer unit (not shown).

The number of collimate lense 11 is not limited to one as shown in this example but two collimate lenses 11 may be provided adjacent to two semiconductor lasers 20 and 21, respectively.

In this embodiment, since the shapes of the spots $S_1$ and $S_2$ on the photosensitive drum 13 are oval (elliptical) having a short axis parallel to the principal scanning direction m, the illustrated embodiment shows only such a construction as that the half wavelength plate 23 is disposed between the second semiconductor laser 21 and the polarizing beam splitter 22. However, the present invention is not necessarily limited to this.

It is also acceptable, for example, that the first semiconductor laser 20 remains in the state as shown in FIG. 3, the half wavelength plate 23 is removed, and the second semiconductor laser 21 is rotated by 90° about the y axis so that the p-n junction direction is in parallel with the x axis. With this construction, the light beam coming from the second semiconductor laser 21 enters into the slant surface 22a of the polarizing beam splitter 22 in the form of s-polarized light and is reflected by the slant face 22a and then emitted towards the collimate lens 11.

The light beams coming from the first and second semiconductor lasers 20 and 21 emitted by the polarizing beam splitter 22 become oval (elliptical) shaped in section in which the long lengths and short lengths thereof are perpendicular to each other, respectively. Accordingly, regarding the shapes of the spots on the photosensitive drum 13, one spot S₁ becomes long in the vertical direction, while the other spot S₂ becomes long in the lateral direction. This is undesirable in view of a formation of an output image.

In this case, therefore, it is desirable to provide light beam shaping means separately so that two light beams emitted by the polarizing beam splitter 22 are formed in oval (elliptical) shapes in section in which the long axis and short axis directions are in alignment or both are formed circular in shape. By providing such light beam shaping means, the spots S₁ and S₂ on the photosensitive drum 13 can be formed in oval (elliptical) shapes, each having a short axis parallel to the principal scanning direction m or formed in circular shapes.

For example, in order to form the spots S₁ and S₂ in circular shapes, it is conceivable that each semiconductor laser 20, 21 is provided with a collimate lens adjacent thereto and by utilizing an aperture of each collimate lens as light beam shaping means, each light beam is shaped in a circular shape in section before it enters into the polarizing beam splitter 22. And in this case, in order to form oval shaped light beams having shapes, anamophotic prisms may be disposed behind each collimate lens. Moreover, in the above-mentioned embodiment, only one example is shown in which the polarizing device is provided with a phase shifter (half wavelength plate, quarter wavelength plate). However, a polarizer may be employed.

If the device of the present invention is constructed such as described above, the light beam emitted by the semiconductor laser and linearly polarized is transfigured into an oval polarization light or into a linearly polarized light different from that when emitted, and is then entered into the fθ lens. Therefore, the change of transmittance due to the change of incident angle with respect to the fθ lens becomes comparatively small and the nonuniformity of light quantity on the subject to be scanned can be reduced.

In the above-mentioned two embodiments, a polygon mirror is used as deflecting means and an fθ lens is used as a scanning lens. However, as a modification thereof, a galvano mirror having a sine vibration deflection characteristic may be used as a deflecting system with an arc sine lens having a distorsion characteristic $F(\theta)$ expressed by $F(\theta)=2f\phi \sin(\theta/2\phi)$, wherein f is a focal distance of a scanning lens, $\theta$ is a deflecting angle, and $\phi$ is an amplitude of a sine vibration.

I claim:

1. A light scanning device comprising:
   a light source equipped with a semiconductor laser;
   deflecting means for deflecting a light beam emitted by said light source, said light beam being deflected in a scanning direction within a plane which is perpendicular to the plane of the P-N junction of said semi-conductor laser;
   a scanning lens for imaging a light beam deflected by said deflecting means on a subject to be scanned; and
   a polarizing device for changing the polarized state of said light beam to include polarized light which contains at least a p-polarized component with respect to an incident plane including an optical axis of the scanning lens and an incident direction of the light beam, said light beam passing through said polarization device only once.

2. A light scanning device as claimed in claim 1, wherein said deflecting means comprises a predetermined scanning characteristics and wherein said scanning lens comprises means for obtaining a velocity of said spot on said subject to be scanned which is directly proportional to said scanning characteristic of said deflecting means.

3. The light scanning device as claimed in claim 1, wherein said deflecting means deflects said light beam only once.

4. A light scanning device comprising:
   a semiconductor laser for emitting an oval light beam in section;
   deflecting means for deflecting the light beam emitted by said semiconductor laser;
   a scanning lens for imaging a light beam deflected by said deflecting means on a subject to be scanned as a spot having an oval shape having a short axis parallel to a principal scanning direction; and
   a polarizing device for changing the polarized state of the light beam to include polarized light which contains at least a p-polarized component with respect to an incident plane including an optical axis of the scanning lens and an incident direction of the light beam, said light beam passing through said polarization device only once.

5. A light scanning device as claimed in claim 4, wherein said polarizing device is disposed somewhere in an optical path between said semiconductor laser and said deflecting means.

6. A light scanning device as claimed in claim 4, wherein said polarizing device is a phase shifter.

7. A light scanning device as claimed in claimed 6, wherein said phase shifter is a quarter wavelength plate.

8. A light scanning device as claimed in claim 6, wherein said phase shifter is a half wavelength plate.

9. A light scanning device as claimed in claim 4, wherein said polarizing device is a polarizer.

10. A light scanning device as claimed in claim 4, wherein said semiconductor laser comprises a p-n junction having a direction parallel to the short axis of said oval shaped spot, and wherein said deflecting means and said scanning lens are effective to bring said direction to be parallel to said scanning direction.

11. The light scanning device as claim in claim 4, wherein said deflecting means deflects said light beam only once.

12. A light scanning device comprising:
    a light source equipped with two semiconductor lasers and for emitting two light beams in a parallel relation;
    deflecting means for deflecting the two light beams emitted by said light source;
    a scanning lens for imaging the two deflected light beams on a subject to be scanned as two non-coincident spots formed along a secondary scanning direction; and
    a polarizing device for changing the polarized state of the light beam to include polarized light which contains at least a p-polarized component with respect to an incident plane including an optical axis of the scanning lens and an incident direction of the light beam, said light beam passing through said polarization device only once.

13. A light scanning device as claimed in claim 12, wherein said light source includes beam shaping means for shaping the two emitting light beams.

14. A light scanning device as claimed in claim 12, wherein said light source includes a beam splitter in which the light beams emitted by said two semiconductor lasers enter from perpendicular directions with respect to each other.

15. A light scanning device as claimed in claim 14, wherein said beam splitter is a polarizing beam splitter and said two semiconductor lasers are disposed such that the light beam polarizing directions of the light beams entering into said polarizing beam splitter are perpendicular to each other.

16. A light scanning device as claimed in claim 14, wherein said beam splitter is a polarizing beam splitter and said two semiconductor lasers are disposed such that the light beam forms an oval shaped spot having a short axis parallel to the principal scanning direction on the subject to be scanned, a polarizing beam splitter in which the light beams emitted by said two semiconductor lasers enter from the perpendicular directions with respect to each other, and a half wavelength plate disposed somewhere in an optical path between one of said two semiconductor lasers and said polarizing beam splitter, and said polarizing device is a quarter wavelength plate.

17. The light scanning device as claimed in claim 12, wherein said deflecting means deflects said light beam only once.

18. A light scanning device comprising:
    a light source equipped with a semiconductor laser;
    means for deflecting a light beam emitted by said light source;
    a scanning lens for receiving said light beam deflected by said means for deflecting at an incident direction and for imaging said light beam deflected by said deflecting means onto a subject to be scanned, said scanning lens comprising an optical axis; and
    means for changing the polarization state of said light beam emitted by said light source, said means for changing the polarization state comprising means for preventing s-polarized light from entering said scanning lens with respect to an incident plane of said light beam, said incident plane including said optical axis of said scanning lens and said incident direction of said light beam, said light beam passing through said polarization changing means only once.

19. The light scanning device as claimed in claim 18, wherein said deflecting means deflects said light beam only once.

20. A light scanning device comprising:
    a light source equipped with a semiconductor laser;
    means for deflecting a light beam emitted by said light source;
    a scanning lens for receiving said light beam deflected by said deflecting means at an incident direction and for imaging said light beam deflected by said deflecting means onto a subject to be scanned, said scanning lens comprising an optical axis; and
    means for changing the polarization state of said light beam emitted by said light source, said means for changing the polarization state comprising means for preventing a vibrating plane of an electric field vector of said light beam, which is perpendicular to an incident plane which includes said optical axis of said scanning lens and said incident direction of said light beam, from entering into said scanning lens from said deflecting means, said light beam passing through said polarization device only once.

21. A light scanning device as claimed in claim 20, wherein said deflecting means deflects said light beam only once.

22. A light scanning device comprising:
    a light source equipped with a semiconductor laser;
    deflecting means for deflecting a light beam emitted by said light source;
    a scanning lens for imaging a light beam deflected by said deflecting means on a subject to be scanned; and
    a polarizing device for changing the polarized state of said light beam to include polarized light which contains at least a p-polarized component with respect to an incident plane including an optical axis of the scanning lens and an incident direction of the light beam, said light beam passing through said polarization device only once.

23. The light scanning device as claimed in claim 22, wherein said deflecting means deflects said light beam only once.

24. The light scanning device as claimed in claim 22, wherein said light beam passes through said polarization device only once.

25. The light scanning device as claimed in claim 23, wherein said light beam passes through said polarization device only once.

* * * * *

UNITED STATES PATENT AND TRADEMARK OFFICE
CERTIFICATE OF CORRECTION

PATENT NO. : 5,009,472
DATED : April 23, 1991
INVENTOR(S) : MORIMOTO

It is certified that error appears in the above-identified patent and that said Letters Patent is hereby corrected as shown below:

At column 2, line 21 of the printed patent, insert ---in density--- after "non-uniform".

At column 6, line 40 of the printed patent, change "lense" to ---lenses---.

At column 7, line 68 (claim 2, line 3) of the printed patent, change "characteristics" to ---characteristic---.

Signed and Sealed this

Twentieth Day of April, 1993

Attest:

MICHAEL K. KIRK

*Attesting Officer*    *Acting Commissioner of Patents and Trademarks*